May 26, 1953 F. HOTCHNER 2,639,918
DISPLAY PROJECTOR
Filed July 12, 1949 3 Sheets-Sheet 3
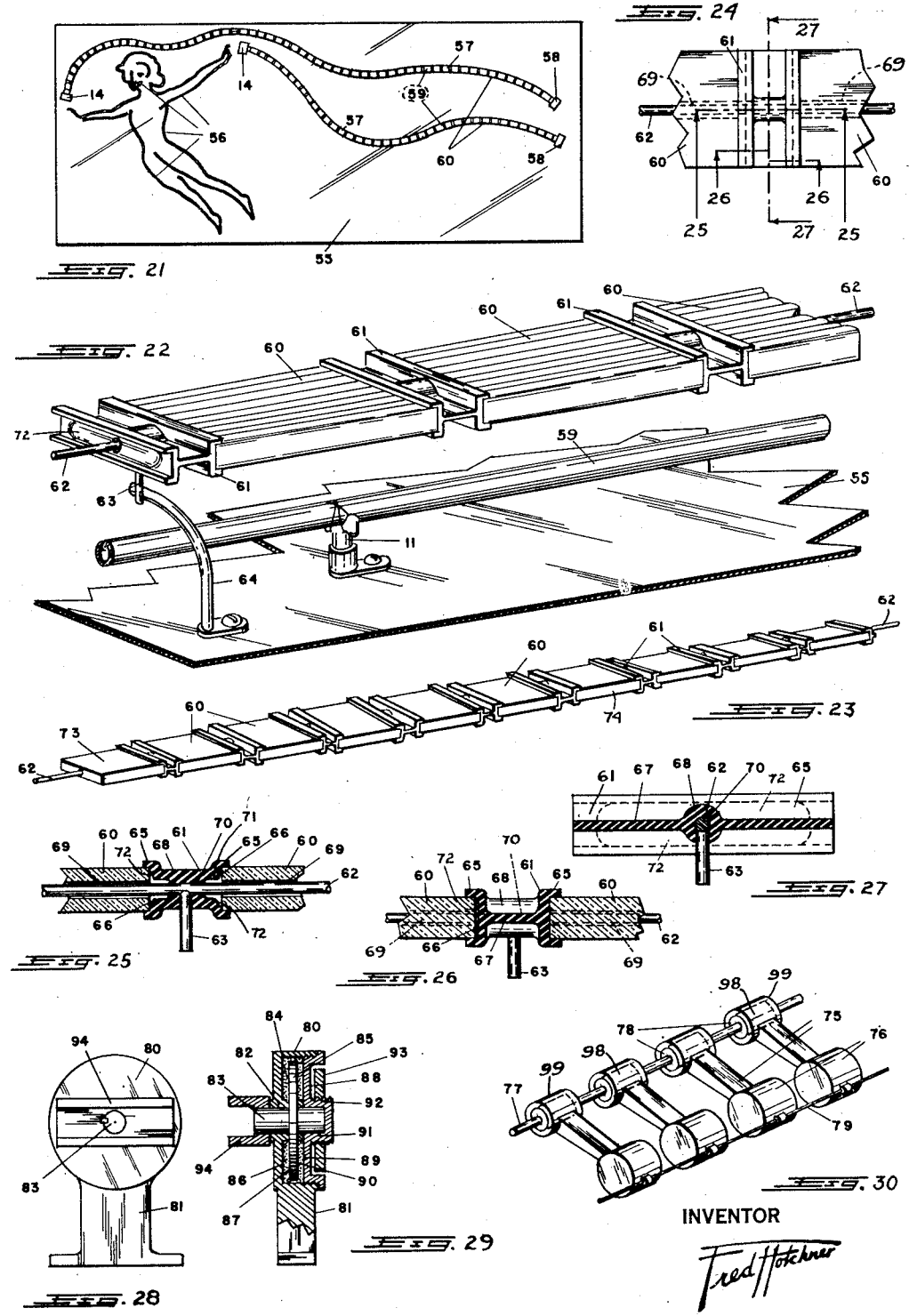
INVENTOR
Fred Hotchner Patented May 26, 1953

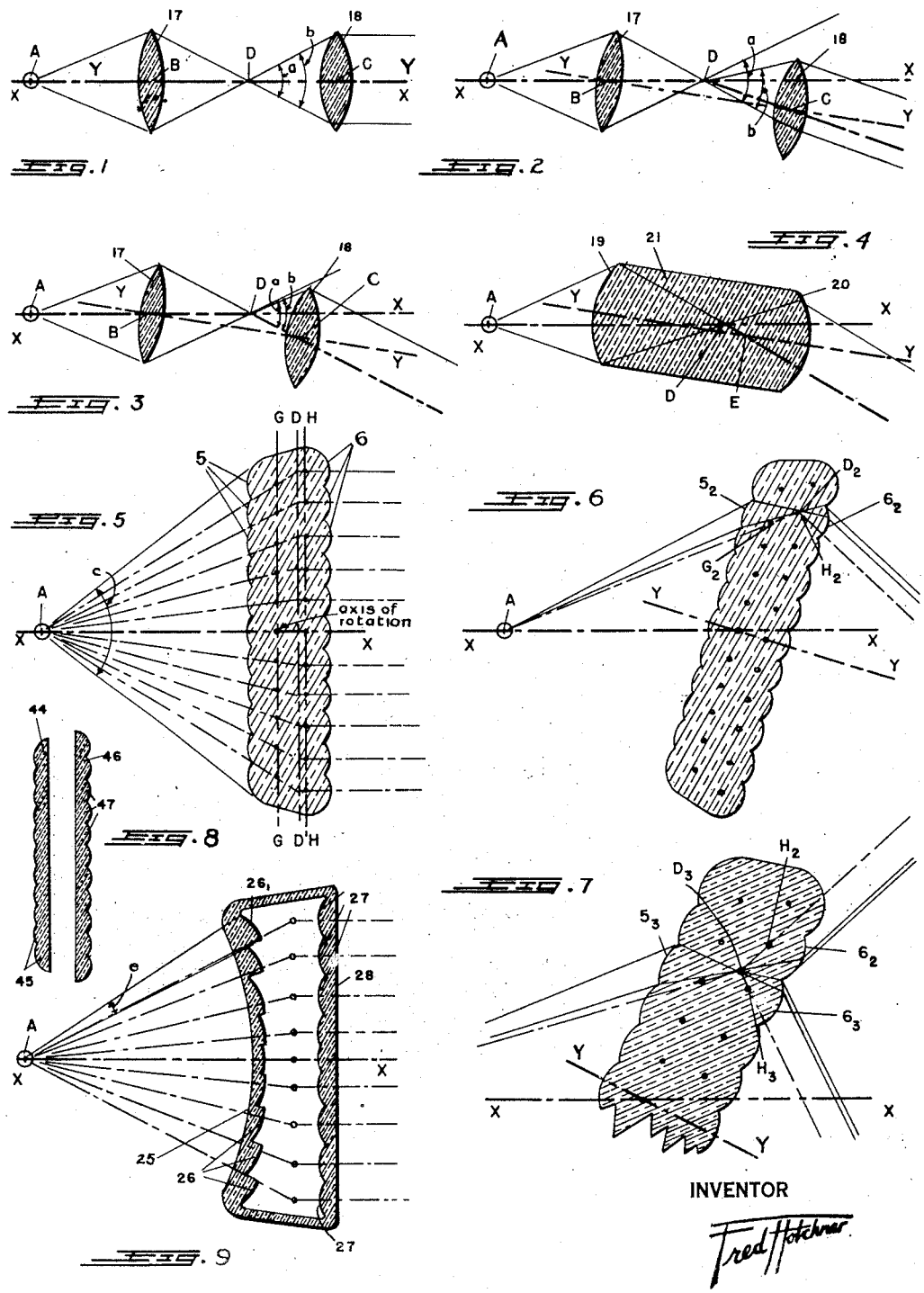

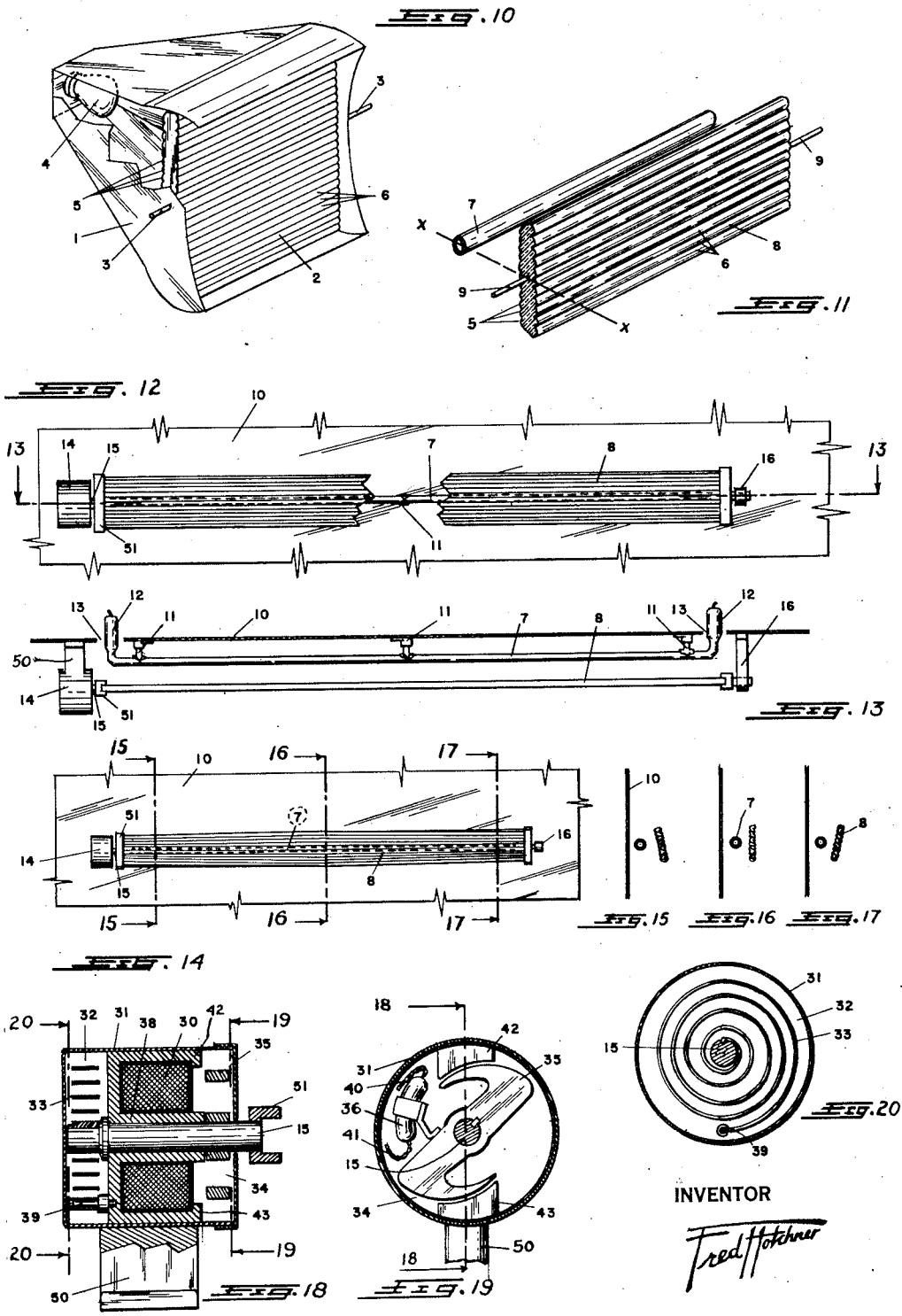

2,639,918

UNITED STATES PATENT OFFICE 2,639,918

DISPLAY PROJECTOR

Fred Hotchner, Los Angeles, Calif.

Application July 12, 1949, Serial No. 104,290

6 Claims. (Cl. 272—8)

This invention relates to a display projector capable of exhibiting to view at great distances and high clarity, outlines, inscriptions, legends or the like in brilliant intermittent flashes of light. The display matter so exhibited may be made to appear as though in animation. Devices constructed in accordance with this disclosure find utility in various kinds of signal and traffic control service, and in advertising and decorative display.

An object of the invention is to provide a projecting refractor which, when actuated in rotation in front of a light source in the projector, will sweep the field of view with beams of a particular specification to produce the effects desired.

Another object is to provide a projecting refractor which will sweep the projected beams over an arc materially amplified over the angular displacement of the refractor.

Another object is to provide a projector in which a series of my novel refractors is employed to variously sweep the field of view with beams derived from different sections of the light source, the refractors in the series being actuated in rotary oscillation by mechanism of extreme simplicity and a high degree of reliability in service.

A most desirable object is served in the production of effects of directional motion along inscriptive conformation of light sources, whereby indications of direction may be given at great distances by signal apparatus so constructed, and attention arresting and pleasing effects achieved in outline decoration and spectacular display.

In my Patent No. 2,272,202 I have disclosed means to produce attraction effects by sweeping the field of view with beams from an elongated light source by the movement of a lens transversely of the source. In my Patent No. 2,272,945 means are disclosed to produce similar effects by the relative shifting of one of a pair of lenticular members transversely of the other in front of an elongated light source, whereby the field of view is swept by beams of different composition to produce similar effects.

It is an object hereof to accomplish similar and improved effects by apparatus of greater simplicity, flexibility and adaptability in commercial applications, and of such reliability under severe service conditions as to be suitable for unattended use in remote locations.

Various other objects will be apparent in the following specification taken together with the drawings in which I have illustrated the invention in certain preferred embodiments of attraction displays. The same reference numeral or letter appearing in several views is indicative of the same element or part throughout.

Figures 1 and 2 are cross sections of a pair of elongated lenses comprising a simplified form of my refractor and illustrate by ray tracing the optical principle involved.

Figure 3 is a similar view illustrating the same lenses differently spaced from each other and the resultant change in the direction of the projected beam.

Figure 4 is a cross section of a single elongated lens designed to function as a projecting refractor and illustrating the optical principle involved.

Figures 5, 6 and 7 are cross sections of my projecting refractor in a preferred embodiment illustrating the formation of the projected beams and the manner in which they sweep the field of view upon rotation of the refractor in front of a light source.

Figure 8 is a cross section of a pair of elongated lenticular plates which, properly dimensioned and operated together in the spacing shown, will serve as the substantial equivalent of the device shown in Figure 5.

Figure 9 is a cross section of a modified embodiment of my refractor.

Figure 10 is a perspective view of a projector including a concentrated filament lamp as the light source.

Figure 11 is a perspective view of a section of a gaseous conduction lighting tube and a corresponding section of a refractor, typical in formation and arrangement of the preferred embodiments of the invention.

Figure 12 is a front elevation of a projector constructed to exhibit, in intermittent flashes, a line of light corresponding to the complete length of an elongated illuminant.

Figure 13 is an elevation of the same, taken as indicated by the section line 13—13 in Figure 12.

Figure 14 is a front elevation of a projector constructed to exhibit the effect of motion in alternate directions along a straight line.

Figures 15, 16 and 17 are cross sections of the same, taken as indicated by the section lines 15—15, 16—16 and 17—17 in Figure 14.

Figure 18 is a cross section of an oscillating motor suitable for driving the refractor, taken along a plane longitudinal with the drive shaft.

Figure 19 is a cross section of the same taken as indicated by the section line 19—19 in Figure 18, and indicating by the section line 18—18 the plane of the section of Figure 18.

Figure 20 is a cross section of the motor taken as indicated by the section line 20—20 in Figure 18.

Figure 21 is a front elevation of an advertising display device illustrating the application of the invention in the construction of animated displays.

Figure 22 is a perspective view of a section of the series of refractors of either outline of the animated feature of the design of the display of Figure 21, shown with the corresponding section of the lighting tube, and illustrating their relationship to each other and their attachment to the display background.

Figure 23 is a perspective view of a series of refractors shown displaced in torsional vibration in the transmission of wave motion.

Figure 24 is a plan view of one of the flexible mountings between two adjacent refractors indicating the section planes of Figures 25, 26 and 27.

Figures 25, 26 and 27 are sectional views of the flexible mounting.

Figure 28 is an end elevation of the wave damper used in the display of Figure 21, and Figure 29 is a longitudinal section of the same.

Figure 30 is a perspective view of an idealized mechanical device illustrating the physical principle of the operation of the refractor series.

The invention provides improvements over those of my patents above-noted in the elimination of any necessity of treating the projector body or background as a rigid base for moving parts or as part of the mechanism.

By the employment of short refractors actuated in rotary oscillation around proximate axes, and flexibly connected in series through which wave motion is propagated, the refractors with their immediate supporting means together with the motor, and when used, a wave damper, comprise a complete self-contained mechanism. This mechanism is not dependent on a rigid base and hence calls for no increased rigidity or other departure from standard practice in the construction of the projector proper beyond that required to hold and support the light source and other parts.

I have chosen to illustrate the invention by one embodiment of a flashing spot light and several embodiments of animated display devices of the general type of electric signs. It is to be understood, however, that it is not limited to the particular types of devices nor to the constructions shown but may be variously embodied and practiced within the purview of the claims.

The projector shown in Figure 10 makes use of a concentrated light source and will exhibit, in intermittent flashes, a bright spot of light to a person in the field of view. It includes the housing, indicated by numeral 1, having the refractor 2 located in the front opening thereof and mounted for rotary oscillation through a small arc on the axial shaft 3 journaled in the housing sides. A portion of the near side is broken away to expose the concentrated filament lamp 4 at the rear, and the edge of the refractor to show the lenticulations 5 on the rear and 6 on the front surfaces. These lenticulations, moulded into the refractor surfaces are in parallel banks on each surface, and parallel as between the two banks, extending in the general direction of the shaft.

The formation, proportioning and spacing of the elements of the device, and the index of refraction of the refractor material are so determined that the following results are had: The lenticulations 5 collect rays from the source and focus them to a bank of coextensive elongated images thereof between the refractor surfaces. The lenticulations 6 focus on these images, each collecting rays from one image and projecting them to the field of view as an elemental beam of low divergence in the vertical direction, parallel to the beams so projected by the other lenticulations, and together projecting a compounded beam of low divergence to the field of view. Rotation of the refractor through a very small arc displaces all of the images simultaneously with respect to the corresponding lenticulations of the front surface with a consequent shift in the direction of the compounded beam. Rotary oscillation of the refractor results in the sweeping of the beam back and forth over the field of view in the direction of its lesser cross-sectional dimension.

By the arrangement of an elongated light source and an elongated refractor mounted to be rotated around an axis extending in the direction of the light source, shown in Figure 11, an elongated streak or line of light is intermittently exhibited. A section of gaseous conduction lighting tube 7 is shown, as typical of this type of light source. The refractor 8 is shown in its relative position, the analysis of the beam projection resulting from rotary oscillation of the refractor around the axis 9 being made in Figures 5 to 7, with reference to the specification.

As shown in Figures 12 and 13, the lighting tube is mounted stationarily on the base or housing of the device, such as the background 10 of the typical electric sign. It is mounted on the usual insulating posts 11, with the electrode terminals 12 extending through the openings 13 to the rear where connection is made in the usual manner to the source of current. Thus, the light source, whatever its type, may be mounted according to the accepted mechanical and electrical standards. The refractor may be driven by any suitable means. A simple drive is shown in the oscillating motor 14, having the drive shaft 15 to which one end of the refractor is secured, with the opposite end journaled in the bearing post 16.

In the description below of the figures in the drawings which illustrate the optical principles involved, the terms used refer to rays and features of the refractors in the planes of the figures.

In Figures 1, 2 and 3, I have shown the optical principle of the invention as it is effective in a simplified form of refractor having but two individual lenses. The lenses 17 and 18, are to be understood as elongated in the direction perpendicular to the plane of the drawing, and mechanically secured in their positions relative to each other with their optical centers on the optical axis Y—Y. The light source is indicated by A, the optical center of the rearward lens 17 by B, and the optical center of the forward lens 18 by C. Through these three points the line X—X is drawn in Figure 1, which may be taken as the optical axis of the device directed to the center of the field of view.

This line coinciding with the axis Y—Y in Figure 1, the refractor is thus indicated as in its medial position. It may be rotated around an axis extending in the general direction of the perpendicular to the plane of the drawing and passing through a point optionally located in a wide region in front of A. For clarity of illustration I have selected point B around which it is shown turned through a small arc in Figure 2, indicative of rotary oscillation in both directions from the medial position.

The conjugate focus of lens 17 is indicated at D. Around this point a space image of the light source will be produced, elongated in the direction of the lens, and of cross-sectional dimensions determined by the finite dimensions of the source, the various aberrations of the lens, and the degree of accuracy of construction of the device. Lens 18, located at focal distance from point D, will collect rays passing through this image and project them in a beam of low divergence in the plane of the drawing. The degree of divergence of the projected beam will depend on the size of the image and the various other factors of lens construction. For the purposes of this invention considerable tolerance may be accepted with commercially acceptable performance.

Upon rotation of the refractor around B, point C is displaced from the axis X—X, and as a consequence, the projected beam takes the direction D—C to the field of view through the optical center of lens 18, as shown in Figure 2. By inspection it is seen: The outside angle of the triangle B—D—C formed by axis X—X with axis Y—Y is greater than the angle D—B—C. Therefore, the angular rotation of the projected beam is amplified over the mechanical rotation of the refractor.

In Figure 3, distance B—C is reduced, other dimensions being unchanged, with a resultant increase in the relative displacement of the beam, illustrating the latitude in selection of dimensions of the system in determining the ratio of amplification of beam rotation to refractor rotation permissible in the practice of this invention.

In these figures, the bundles of rays passing through D are indicated by angle "$a$." That portion of the bundle collected in each case by lens 18 is indicated by angle "$b$." A certain reduction in efficiency with increased displacement of the refractor is thus apparent. It is an object of the invention, in the constructions of Figures 5 to 9, to effect substantially complete utilization of the rays passing through the images in the formation of the projected beam.

In the refractor illustrated in Figure 4, the two surfaces 19 and 20 of the single lens 21 replace the individual lenses 17 and 18. Though the image is formed within the lens body, the principle is substantially the same, with a gain in efficiency by halving the number of refracting surfaces at which reflection reduces the lens efficiency. The direction of the projected beam, as before, is found by drawing the chief ray thereof from the image point D through the center of curvature of the exit surface indicated by E. The commercial embodiment of the device typified in this view is shown in Figure 5 and associated views as developed to provide a light, thin element capable of collecting rays over a wide angle from the source and of utilizing them at high efficiency in the projection of one or more beams to the field of view.

For reasons of clarity in illustration, the refractor shown in cross section in Figure 5 is much thicker than it need be relative to its width in practice. In fact it may be manufactured just as thin as it is possible to fabricate it by casting, moulding, extruding, or otherwise forming the material within permissible dimensional tolerances, and within permissible deviation from the idealized optical performance explained below. In reducing the relative thickness, the number of lenticulations is increased, but the relationship outlined below is maintained and the principle of operation unchanged. The angle "$c$" over which rays from the source are collected may be increased by designing the refractor to operate relatively closer to the source. In so doing the refractor is caused to collect a greater percentage of the direct rays from the source. However, this advantage is partially offset by the difficulty of designing a refractor which is too close to the source in such manner that the elemental beams projected by the lenticulations at the edges will be parallel with the beams from the central lenticulations to a satisfactory degree for all positions of the refractor in its oscillation. This relationship must be determined by the controlling factors of design for each practical application.

In Figure 5 the refractor is shown in its medial position projecting a single compounded beam directly forward to the field of view along the direction of the optical axis of the display device X—X drawn from the center of the light source at A, through the central lenticulations to the field center. The lenticulations 5 on the rear surface collect rays from the source and condense them to a bank of images thereof between the two surfaces. The lenticulations 6 on the front surface focus on these images, collect rays passing through the image regions and project them as elemental beams, substantially parallel to each other, to the field of view, which elemental beams in effect constitute a single compounded beam.

As the lenticulations on both surfaces are elongated in the direction perpendicular to the drawing, the images will be similarly elongated, and the projected elemental beams will be of low divergence in the plane of the drawing, and freely divergent in the direction perpendicular thereto. This will hold true for either a point source or a line source of light. The compounded beams will also be of low divergence in the plane of the drawing. To provide the effect of an elongated streak of light in brilliant illumination to view, the light source employed is an elongated illuminant, such as a gaseous conduction lighting tube, extending lengthwise of the refractor.

Considering now the optical principle involved, as illustrated by the tracing of the chief rays of the collected and projected beams in dot and dash lines in Figure 5: the descriptions of "lines" in the diagram refer to planes in the solid device, and the descriptions of "points" in the diagram, to lines in the device.

As an arbitrarily elected design feature, the lenticulations 5 are all of the same curvature, the centers of which lie along the line G—G. The chief ray of each of the bundles of rays collected by these lenticulations is drawn to the conjugate focal point through the corresponding center of curvature from A. It is to be understood, of course, that these chief rays need not necessarily be included in either the collected or projected rays, but may be virtual in one or both instances, as illustrated in Figure 6. The conjugate focal points are shown as lying approximately along the line D—D, which line in practice may be curved.

To provide parallel projection of the elemental beams in the direction of X—X, the centers of curvature of lenticulations 6 are located directly forward of the conjugate focal points, around which the images are formed, and at such spacing that the lenticulations focus each on the corresponding image. The centers of curvature are shown lying along the straight line H—H, but may, if the factors of any design so require, be located along a line of suitable curvature. The projected compounded beam is represented by the chief rays of the elemental beams drawn in dot and dash lines from the image points, through the centers of curvature of lenticulations 6 to the field of view.

The axis of rotation, around which the refractor is turned to sweep the field of view with the beams, may be located optionally at any of a number of points over a wide region in front of the light source, but preferably is located along axis X—X close to the refractor. I have elected to locate it at the junction of this axis with line G—G, thus indicating it to extend in the general direction of the refractor perpendicular to the drawing. In Figure 6, the refractor is shown rotated 17 degrees clockwise.

The new direction of the projected compounded beam is found by tracing the chief ray of the bundle of rays collected by one of the lenticulations $5_2$ through the center of curvature thereof, indicated by $G_2$ to the new image point $D_2$. As all of the rays passing through the image point fall on lenticulation $6_2$ but a single beam is projected to the field. We draw the chief ray of this beam from $D_2$ through center of curvature $H_2$ which gives us the new direction as 46 degrees. This is an amplification of beam rotation over refractor rotation of 270%.

Outlining the bundle of rays in the collected and projected elemental beams in solid lines we find that the chief rays in both cases are virtual.

A similar tracing of the beams projected through the rest of lenticulations 6 will show that, within variations permissible for the purposes of the invention, they are parallel, thus constituting in the aggregate a rotating compounded beam.

From the ray tracing it is seen that the elemental beam is projected through the upper portion of lenticulation $6_2$, the chief ray being virtual. The angular rotation of the refractor of this figure is therefore the extreme rotation, with this optical system, through which the refractor may be turned before each of the rays passing through the image fall on more than one lenticulation.

Further rotation to a position such as that shown in Figure 7 results in the formation of double secondary beams from the rays passing through the individual images. In this figure, the upper portion of the refractor is shown enlarged, with the rays collected by lenticulation $5_3$ shown traced to the image at point $D_3$, and through to the lenticulations $6_2$ and $6_3$ which share the diverging bundle of rays from the image. Drawing the virtual chief rays from $D_3$ through the centers of curvature $H_2$ and $H_3$ to the field of view we have the directions of the two elemental beams to the field of view.

The same condition will be found in the collection of rays through the remaining images, there being therefore, two compounded beams projected to the field. These compounded beams move in the same direction over the field, the secondary beam appearing late in the rotation to extreme position of the refractor and disappearing early in the rotation to medial position. If the angular displacement of the refractor is confined to the position shown in Figure 6, but one beam will sweep the field. For many purposes, this angle covers the effective field of view. This construction, and modifications thereof which will be apparent, constitute commercial forms of the refractor for single beam projection.

By variations from the proportioning of the dimensions shown, the secondary beam may be made to appear earlier, and a third, a fourth, or even more, beams produced. There being a number of variable factors involved in the determination of practical designs of the refractor, and considerable deviation permissible from theoretically perfect optical performance, various satisfactory embodiments of the invention may be constructed by sacrificing some of the theoretical considerations for practical advantages.

The refractor shown in cross section in Figure 9 is designed to be produced as a hollow block, similar to glass building blocks, with smooth outside surfaces and lenticulated inside surfaces. The lenticulated surfaces are thus completely protected from dirt accumulation, and the smooth surfaces best adapted to be cleaned by the action of wind and rain are exposed. The rearward wall 25 of this block is concave to the light source, and formed with the lenticulations 26. The extreme lenticulation $26_1$ constitutes approximately one half of a cylindrical lens, that portion which will direct the bundle of rays "e" most effectively forward to the image point. This formation is the equivalent of a lens and a prism. It compensates for the sharp angle made by the chief ray of the bundle of rays collected with the projected beam. As each succeeding lenticulation toward the center of the refractor collects rays at a lesser angle with the projected beam, a greater percentage of a cylindrical lens is utilized progressively toward the center. By this construction the rays directed to the lenticulations 27 of the forward wall 28 are confined to bundles having medial rays approximately parallel to the axis X—X.

The refractor may be variously modified and embodied either in integral or unitary structures as contemplated by the language of the claims in carrying out the principle above described. For instance:

A refractor consisting of two lenticular plates such as those indicated by 44 and 46 in Figure 8, mounted in appropriate fashion and operated in the relationship to each other shown, may be used as the substantial equivalent of the device shown in Figure 5. Proper contouring of the lenticulations 45 of the plate 44, with relation to the elected position of the light source to the left of the figure, will constitute these collecting lenticulations the equivalent of the lenticulations 5 of Figure 5. Similarly, proper contouring of lenticulations 47 of plate 46, with relation to the image positions and in consideration of the refraction of the left surface of the plate, will constitute them projecting lenticulations as above described.

To produce the effect of animation or motion along the inscription outline, the refractor is constructed so that, from place to place along the inscription outline, the beams take different directions to the field of view at each instant during the cycle of changes. Observing the device in operation, a person will be reached by beams from different areas of the refractor in a time order depending on the construction of the device. At any instant, all of those refractor areas which are sending beams to his position will appear bright to him, while all of those areas which are sending beams to some other part of the field will appear dark to him. The changing bright and dark areas thus produced along the inscription outline will appear to him as motion of bright areas therealong.

The dark areas as thus seen, do not represent illumination lost, but rather illumination which is effective in the production of the animation as seen from other parts of the field of view. High efficiency in utilization of the projected beams is thus had. With the practical forms of the invention, the effect will be essentially the same over the normal field of view, but will be seen in a different phase from one place to another thereover in the direction of travel of the beams.

In the embodiment of the invention shown in front elevation in Figure 14 the refractor is formed with a helical twist so that the projected beam from the left is directed upward relative to the beam projected from points to the right along the inscription. The device is similar in other respects to that shown in Figures 12 and 13. The relative slant of the refractor at the points indicated by section lines 15—15, 16—16 and 17—17 is shown in Figures 15, 16 and 17, with the refractor in the medial position, which is the position in which the beam from the center at 16—16 is directed straight forward.

As the motor 14 oscillates the refractor through a small arc in each direction from this medial position the beam will be swept over the field of view in the vertical direction. A certain part of the field will be reached by the beam from all points along the refractor, and for this particular device, that may be considered to be the normal field of view, from all points of which the entire animation effect will be seen. The effect will be that of a bright area moving alternately to the right and to the left along the length of the refractor. There will be a range of points of view above the normal field which will be reached by the beam from the left portion of the refractor, and a range of points of view below the normal field which will be reached by the beam from the right portion of the refractor, the percentage of the entire effect which will be thus observed being less the farther from the normal field one moves.

Various types of drive mechanisms may be used to operate the refractors of devices constructed to carry out this invention, different drives being selectively the more suitable for the various constructions and conditions of operation. The oscillating motor of Figures 18, 19 and 20 is shown as typical of one class of drive which may take various embodiments, vibratory drives of several kinds being known in the art.

The motor 14 includes the end gap solenoid 30 encased in the housing 31, which provides an end chamber 32 enclosing the spiral spring 33 at one end of the solenoid, and an end chamber 34 at the other end enclosing the armature 35 and mercury switch 36. The drive shaft 15, extending through the journal 38 through the center of the solenoid, is rigidly secured to the armature and to one end of the spring. The other end of the spring is rigidly secured to the pin 39 in the solenoid frame. The motor is provided with suitable mounting means, such as the base 50. The drive shaft carries suitable means for attachment to the refractor, such as the channel member 51.

The armature carries the mercury switch, which is connected by flexible wires 40 and 41 in series with the solenoid. It is urged to the rest position shown in Figure 19 by the spring, in which position the mercury switch is closed. Energization of the solenoid attracts the armature in counterclockwise rotation to bridge the solenoid pole pieces 42 and 43, and thereby tilting the switch to open the circuit. The switch is constructed so that in operation the mercury bridges the electrodes for a period of the swing sufficient for the moving elements to acquire the necessary momentum to sustain oscillation. The weight of the moving parts acts with the resilience of the spring to form the oscillating couple of the mechanical system thus formed. A device including a motor of this type will therefore assume its natural period of oscillation. By building into the device suitable adjustment devices, the period of oscillation and the amplitude may be controlled. Such adjusting means, being known in the art, are eliminated from the view.

In the embodiment of the invention shown in Figures 21 to 29 the effect of motion is produced along convoluted inscription outlines of considerable length corresponding to inscription features of a design in gaseous conduction luminous tubing. The refracting means in this construction consists of a series of refractors, each mounted by resilient supporting means to a common support and all associated together in an elastic wave transmission line. Each refractor, with its supporting means forms a vibrating couple in rotary oscillation as described above. The entire series forms an elastic wave transmission line along which torsional displacement is transmitted from one refractor to the next in wave motion.

Such a line may be driven from any point, and will transmit vibratory motion for considerable distances, requiring but very light and simple driving apparatus and calling for the expenditure of but little power. No bearings, sliding or other wearing parts being involved, it may be installed in locations difficult of access and will operate without attention for long periods of time. The line is preferably driven from one end, with a wave damper connected to the last refractor at the opposite end to absorb the energy of the received waves to prevent reflection and thereby permit of the production of the effect of continuous motion in one direction as explained below.

The invention in this species is capable of various modifications and embodiments as to the details of construction of the transmission line. The particular combination of elements shown being illustrative of the principle involved, it is not intended as imposing any limitation on the invention not imposed by the claims.

The electric display shown in Figure 21 is typical of the embodiment of the invention in this species in electric signs. The sign shown presents the background 55 on which is mounted the luminous tubes and animation device, and contains the usual terminal provisions for the tubes, transformers and other conventional parts. A pictorial design is represented by luminous tubes 56, there being two tubes representative of feature outlines to be animated positioned behind the two series of refractors 57 in the fashion shown in the perspective view of Figure 22. At the left end of each series is an oscillating motor 14 which imparts rotary oscillations to the line which are transmitted in a torsional wave to the right. At the right end of each line is a wave damper 58 which absorbs the energy of the wave by viscous drag.

The relative positioning of the refractor series, luminous tube and background is shown in Figure 22, reference being had to Figure 5. The luminous tube 59 is mounted in the usual fashion to the background by insulating posts 11. The refractors 60 are assembled with intermediate rubber bars 61 along a support wire 62, from which support wire are stud wires 63 extending backwards for spot weld attachment to brackets such as 64 at convenient intervals, for attachment to the background. The series is capable of being convoluted to a certain extent to follow outlines such as that shown in Figure 21, the bends being made at the locations of the rubber bars.

In Figure 24 is shown a view of one rubber bar and a short section of each of the adjacent refractors with section lines 25—25, 26—26 and 27—27 indicating the planes on which the sectional views of 25, 26 and 27 are taken.

Each bar consists of a pair of channel portions 65 facing away from each other to present the grooves the inside surfaces of which 66 which are cemented to the adjacent refractors, the connecting web 67 and the hub 68, in an integral member of resilient rubber or other elastic material.

Each refractor is provided with the longitudinal hole 69 through which the wire 62 passes freely. The wire passes through the hub 68 and is cemented to it at the mid-portion indicated by 70 in Figure 25. As shown in this view, the stud wires are spot welded to the support wire and extend through the hub. These stud wires may be provided at as frequent intervals along the series as desired, and if not used for attachment to the brackets 64, are not disturbed as they do not interfere with the operation.

The rubber bar acts as a resilient arm acting against the weight of the refractors in rotation around the wire 62. In order to permit of the flexing of the rubber it is advisable to leave the portions of the hub indicated at 71 in Figure 25 free of attachment to the support wire and further to leave the central area of the channel grooves between the dotted lines indicated by 72 in Figure 27 free of attachment to the refractors.

In Figure 23 a portion of the series is shown with the refractors displaced in a traveling wave on the line. The refractor 73 is in the medial position, the displacement being clockwise in increasing and decreasing values in successive refractors to refractor 74 at the medial position, the displacement beyond this being counterclockwise for the instantaneous condition shown.

The construction shown is a compromise with practical requirements of construction of the idealized vibrating system shown in the perspective view of Figure 30. In this view, a series of rigid arms 75, carrying the weights 76, are mounted on the cylindrical bushings 78, of soft rubber or other elastic material, along the support wire 77. The bushings are cemented tight to the wire and to the inside surfaces of the bores 98 of the arm hubs 99. Rotation of the arm is resisted by torsional strains set up in the bushing, the weight of the arm acting with the elasticity of the bushing to form an oscillating couple. The wire 79 extending the length of the series and attached to the arms, transmits the wave motion along the line.

In the practical construction shown, each refractor turns around the support wire acting against the resilience of both rubber bars to which it is attached thus forming the oscillating couple, while the webs 67 transmit the wave motion along the line. Various modifications of this construction may be adopted to meet different service conditions without departing from the spirit of the invention.

The wave damper shown in Figures 28 and 29 may be used at the end of the line to absorb the energy of the wave and thus insure unidirectional wave motion. The device consists of the body 80, provided with the mounting base 81, having a journal 82 carrying the shaft 83, and formed to provide an oil chamber 84 in which the disk 85, tight to the shaft, turns. The oil chamber, formed in the body and presenting one wall 86 to one side 87 of the disk, is closed by the plug 88 which presents one wall 89 to the opposite side 90 of the disk. The plug receives the inner end of the shaft in the journal 91 and has an external threaded hub 92 on which a magnet 93 is adjustably carried. The extension of the shaft carries the channel member 94 to receive the end refractor in the series and be driven by it.

The chamber is filled with a mixture of oil and iron powder which is known to develop a viscous drag variable with the magnetic flux traversing the chamber. The device is therefore constructed of material which is magnetizable and provides a flux path from the magnet through the chamber and disk. The intensity of the flux is controlled by threading the magnet along the hub to vary its spacing from the chamber and thereby vary the intensity of the magnetic field passing through the oil-iron powder mixture. The resistance offered by the device to oscillation of the last refractor in the line may thus be adjusted to a value which will prevent the reflection of the received waves.

To produce a display device to exhibit the effect of continuous motion in one direction along an inscription the refractors must be actuated in a continuous unidirectional wave motion, each refractor oscillating around its axis of rotation in timed order with the adjacent refractors so that an observer in the field of view is reached by beams projected by successive refractors along the series.

The refractors of such a device should oscillate, preferably, at their natural frequency of vibration and the motor should drive at that same frequency. The wave damper should be adjusted to completely absorb the incoming wave energy with no reflection.

Various other motion effects may be produced by adjustments of the wave damper at a value other than that which would completely absorb the incoming energy and would permit reflection of a portion of the energy of the wave, elimination of the wave damper, and variations in the length of the line in values other than multiples of the wave length.

Any other suitable means may be used for driving the refractors within the purview of the claims.

The terms "light source" and "illuminant" as used in the claims embrace any primary source of radiation and any object or surface rendered luminous by a primary source and functioning as the light source as described above.

The term "inscription" embraces any line, outline or lineal conformation.

Having thus described my invention, what I claim is:

1. A display device for sweeping the field of view with a beam, including: a light source, a refractor positioned in front of said source at a distance substantially less than optical infinity for the refractor by means restricting said refractor to rotary motion around an axis transverse of the medial line of sight from the field of view, in front of said source and close to said refractor, said refractor having a plurality of elongated collecting lenticulations extending in the general direction of said axis and in close bank formation in a direction transverse of the lenticulations and said line of sight, which lenticulations are so conformed that they produce a bank of elongated images of said source close to the lenticulations as compared to the spacing between the lenticulations and said source, said refractor also having a plurality of elongated projecting lenticulations extending in the same general direction as said collecting lenticulations and in similar bank formation, which projecting lenticulations are conformed to focus on said images and project therefrom to the field of view a plurality of substantially parallel elemental beams of low divergence in the direction transverse of the lenticulations, which elemental beams aggregate in a compounded beam of low divergence, said collecting and projecting lenticulations being spaced and conformed so that rotation of said refractor in either direction from a positional normal to the medial line of sight from the field of view around said axis will cause a shift of all of the said images in the same direction transverse of the lenticulations whereby to rotate said elemental beams and sweep the field of view with said compounded beam, and means to oscillate said refractor around said axis between two positions of rotation with the refractor facing generally in the direction of the medial line of sight from the field of view.

2. The combination as set forth in claim 1 in which the light source is an elongated illuminant extending in the same general direction as that of the lenticulations of the refractor.

3. A display device for sweeping the field of view with a plurality of beams, including: a light source, a series of refractors, each positioned in front of said source at a distance substantially less than optical infinity for the refractor by means restricting the refractor to rotary motion around an axis transverse of the medial line of sight from the field of view, in front of said source and close to the refractor, each of said refractors having a plurality of elongated collecting lenticulations extending in the general direction of its axis and in close bank formation in a direction transverse of the lenticulations and said line of sight, which lenticulations are so conformed that they produce a bank of elongated images of said source close to the lenticulations as compared to the spacing between the lenticulations and said source, each refractor also having a plurality of elongated projecting lenticulations extending in the same general direction as said collecting lenticulations and in similar bank formation, which projecting lenticulations are conformed to focus on said images and project therefrom to the field of view a plurality of substantially parallel elemental beams of low divergence in the direction transverse of the lenticulations, which elemental beams aggregate in a compounded beam of low divergence, said collecting and projecting lenticulations being spaced and conformed so that rotation of the refractor in either direction from a position normal to the medial line of sight from the field of view around the respective axis will cause a shift of all of said images in the same direction transverse of the lenticulations whereby to rotate said elemental beams and sweep the field of view with said compounded beam, and means to oscillate each of said refractors around its respective axis between two positions of rotation with the refractor facing generally in the direction of the medial line of sight from the field of view.

4. A display device for sweeping the field of view with a plurality of beams, including: an elongated illuminant, a series of refractors positioned along and in front of said illuminant, each at a distance substantially less than optical infinity for the refractor by means restricting the refractor to rotary motion around an axis transverse of the medial line of sight from the field of view, in front of said illuminant, extending in the same general direction as the illuminant and close to the refractor, each of said refractors having a plurality of elongated collecting lenticulations extending in the general direction of its axis and in close bank formation in a direction transverse of the lenticulations and said line of sight, which lenticulations are so conformed that they produce a bank of elongated images of said illuminant close to the lenticulations as compared to the spacing between the lenticulations and said illuminant, each refractor also having a plurality of elongated projecting lenticulations extending in the same general direction as said collecting lenticulations and in similar bank formation, which projecting lenticulations are conformed to focus on said images and project therefrom to the field of view a plurality of substantially parallel elemental beams of low divergence in the direction transverse of the lenticulations, which elemental beams aggregate in a compounded beam of low divergence, said collecting and projecting lenticulations being spaced and conformed so that rotation of the refractor in either direction from a position normal to the medial line of sight from the field of view around the respective axis will cause a shift of all of said images in the same direction transverse of the lenticulations whereby to rotate said elemental beams and sweep the field of view with said compounded beam, and means to oscillate each of said refractors around its axis between two positions of rotation with the refractor facing generally in the direction of the medial line of sight from the field of view.

5. A display device for sweeping the field of view with a plurality of beams, including: a light source, a series of refractors positioned in front of said light source, each at a distance substantially less than optical infinity for the refractor by vibratory means restricting the refractor to rotary motion around an axis transverse of the medial line of sight from the field of view, in front of the light source and close to the refractor, the axes of the refractors being in alignment along the series, the vibratory means of each refractor resiliently urging it to a medial position facing the field of view against rotary displacement in either direction therefrom whereby to comprise with the refractor a vibrating couple, coupling means between adjacent refractors along the series to transmit vibratory motion from one refractor to the next, and means to oscillate one refractor of the series whereby to cause waves of vibratory motion to travel along the series, each of said refractors having a plurality of elongated collecting lenticulations extending in the general direction of its axis and in close bank formation in a direction transverse of the lenticulations and said line of sight, which lenticulations are so conformed that they produce a bank of elongated images of said source close to the lenticulations as compared to the spacing between the lenticulations and said light source, each refractor also having a plurality of elongated projecting lenticulations extending in the same general direction as said collecting lenticulations and in similar bank formation, which projecting lenticulations are conformed to focus on said images and project therefrom to the field of view a plurality of substantially parallel elemental beams of low divergence in the direction transverse of the lenticulations, which elemental beams aggregate in a compounded beam of low divergence, said collecting and projecting lenticulations being spaced and conformed so that rotation of the refractor in either direction from the medial position to which it is urged by the respective vibratory means around the respective axis will cause a shift of all of said images in the same direction transverse of the lenticulations whereby to rotate said elemental beams and sweep the field of view with said compounded beam.

6. A display device for sweeping the field of view with a plurality of beams, including: an elongated illuminant, a series of refractors positioned along and in front of said illuminant, each at a distance substantially less than optical infinity for the refractor by vibratory means restricting the refractor to rotary motion around an axis transverse of the medial line of sight from the field of view, in front of said illuminant and close to the refractor, the axes of the refractors being in alignment along the series, the vibratory means of each refractor resiliently urging it to a medial position facing the field of view against rotary displacement in either direction therefrom whereby to comprise with the refractor a vibrating couple, coupling means between adjacent refractors along the series to transmit vibratory motion from one refractor to the next, and means to oscillate one refractor of the series whereby to cause waves of vibratory motion to travel along the series, each of said refractors having a plurality of elongated collecting lenticulations extending in the general direction of its axis and in close bank formation in a direction transverse of the lenticulations and said line of sight, which lenticulations are so conformed that they produce a bank of elongated images of said illuminant close to the lenticulations as compared to the spacing between the lenticulations and said illuminant, each refractor also having a plurality of elongated projecting lenticulations extending in the same general direction as said collecting lenticulations and in similar bank formation, which projecting lenticulations are conformed to focus on said images and project therefrom to the field of view a plurality of substantially parallel elemental beams of low divergence in the direction transverse of the lenticulations, which elemental beams aggregate in a compounded beam of low divergence, said collecting and projecting lenticulations being spaced and conformed so that rotation of the refractor in either direction from the medial position to which it is urged by the respective vibratory means around the respective axis will cause a shift of all of said images in the same direction transverse of the lenticulations whereby to rotate said elemental beams and sweep the field of view with said compounded beam.

FRED HOTCHNER.

References Cited in the file of this patent

UNITED STATES PATENTS

| Number | Name | Date |
|---|---|---|
| 2,351,034 | Gabor | June 13, 1944 |
| 2,389,911 | Hotchner | Nov. 27, 1945 |
| 2,419,216 | Hotchner | Apr. 22, 1947 |